Oct. 15, 1968  F. E. ERICKSON  3,406,303
BI-DIRECTIONAL MOTOR REVERSAL CONTROL DEVICE
Filed May 5, 1965  2 Sheets-Sheet 1
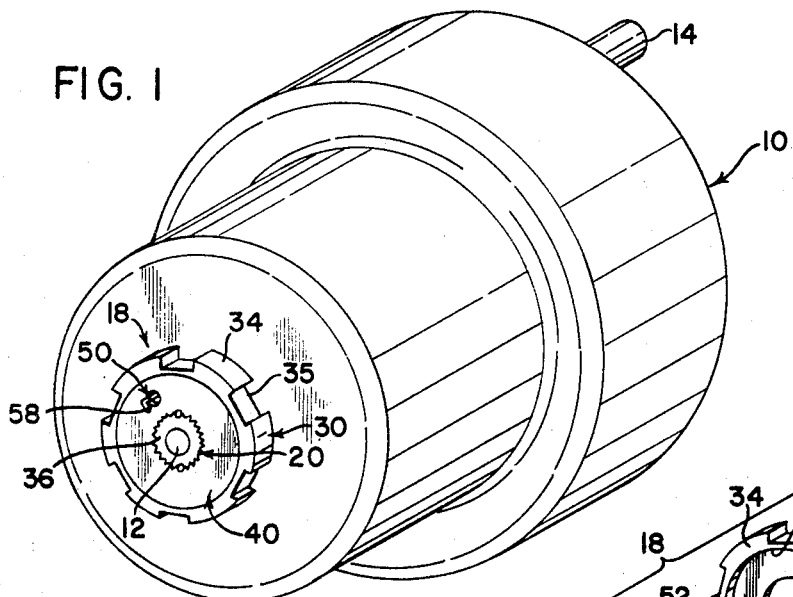
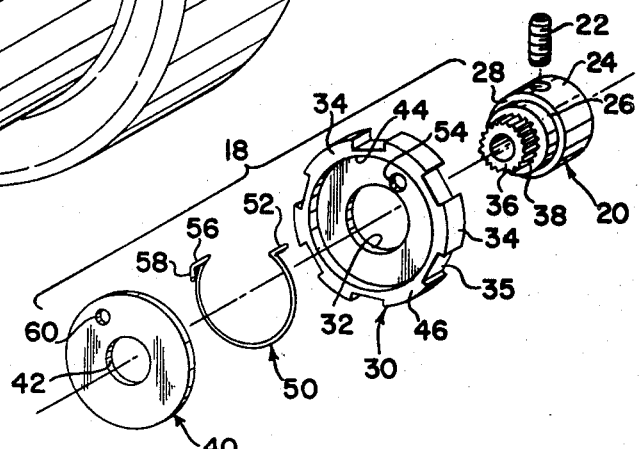
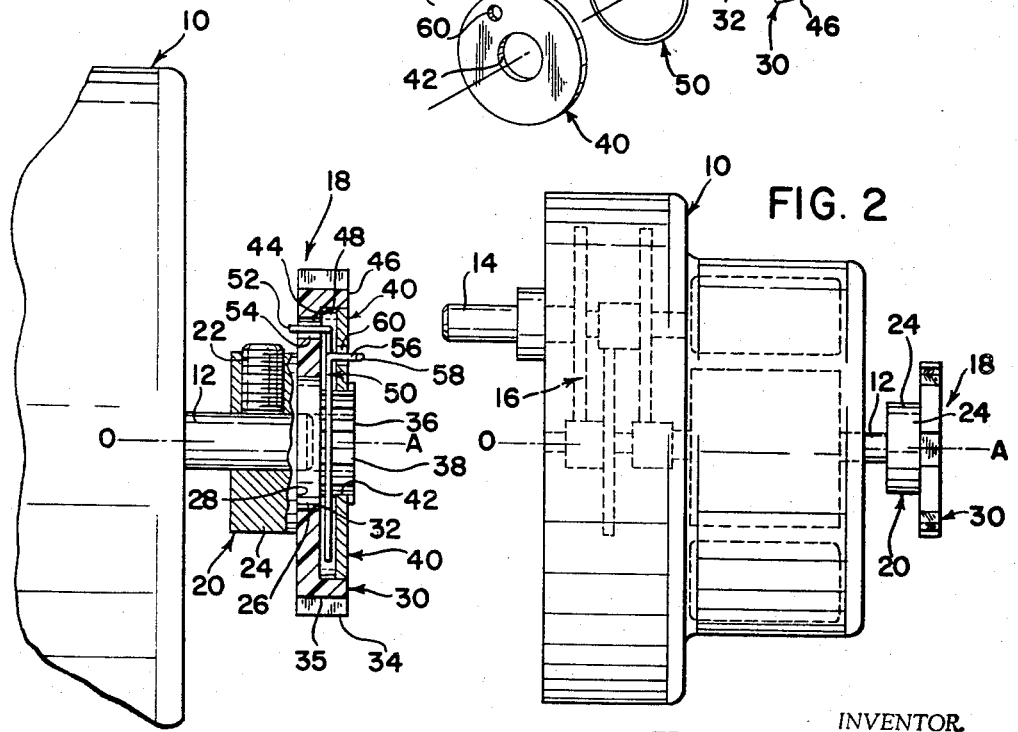
INVENTOR.
FREDERICK E. ERICKSON
BY *Tilberry & Body*
ATTORNEYS Oct. 15, 1968  F. E. ERICKSON  3,406,303

BI-DIRECTIONAL MOTOR REVERSAL CONTROL DEVICE

Filed May 5, 1965  2 Sheets-Sheet 2

INVENTOR.
FREDERICK E. ERICKSON

BY *Tilberry & Body*

ATTORNEYS

United States Patent Office 3,406,303
Patented Oct. 15, 1968

3,406,303
BI-DIRECTIONAL MOTOR REVERSAL
CONTROL DEVICE
Frederick E. Erickson, Port Byron, Ill., assignor to
E. W. Bliss Company, Canton, Ohio, a corporation
of Delaware
Filed May 5, 1965, Ser. No. 453,297
10 Claims. (Cl. 310—40)

ABSTRACT OF THE DISCLOSURE

A control device is disclosed herein for purposes of reversing the direction of rotation of the rotor shaft of a bi-directional motor while the motor is energized. The control device includes a first member which is adapted to be mounted on the rotor shaft for rotation therewith, and a second member rotatably mounted in substantial coaxial relationship to the first member. A spring serves to couple rotational drive forces between the members. A means, such as a pawl, serves to engage the second member to stop rotation thereof in each of two opposing directions. The spring is sufficiently resilient to permit a degree of relative rotation between the members after the second member has stopped rotation in one of the directions and thereby store energy in the coupling means, which energy ultimately rebounds the first member for rotation in the opposite direction.

This invention relates to the art of motor controls and, more particularly, to a device for reversing the direction of rotation of the rotor shaft of a bi-directional motor while the motor is energized.

The present invention is particularly applicable for reversing the direction of rotation of the rotor shaft of a permanent magnet, synchronous motor utilized in conjunction with an electric timer, and it will be described with particular reference thereto; although, it will be appreciated that the invention has broader applications and may be used with various bi-directional electric motors.

It is common practice in the manufacture of an electric timer to use a synchronous motor of the permanent magnet type for driving the timer. Such motors are especially desirable because of their simplicity, dependability and relative economy. Also, these motors have an inherent characteristic of being able to start and run in either direction. Such motors are often used for driving an electric timer in which it is desired to reverse the direction of rotation of the rotor shaft while the motor is energized. Bi-directional motor reversal control devices are known which operate directly on the rotor shaft for reversing the direction of rotation of the rotor shaft while the motor is energized. However, such devices heretofore had to be phased with a field pole position of the motor so that when the rotor shaft is stopped, the poles of the rotor shaft are spaced from the field poles. Otherwise the rotor shaft is locked in a dead spot and will not restart in the opposite direction.

The present invention contemplates a mechanical device for reversing the direction of rotation of a bi-directional motor, such as a permanent magnet, synchronous motor, directly at the rotor shaft, which allows reversal of the direction of rotation of the shaft while the motor is energized without regard to the position of the rotor with respect to the field poles of the motor, thereby overcoming the above-mentioned difficulties of previous motor reversal control devices.

In accordance with the present invention, the control device for reversing the direction of rotation of the rotor shaft of a bi-directional motor while the motor is energized includes: a hub mounted on the rotor shaft for rotation therewith; a wheel rotatably mounted in substantial coaxial relationship to the hub; energy storing resilient means coupling the hub and wheel so that they rotate together; and, a means, such as a pawl, for engaging the wheel to stop rotation thereof in a given direction when it is desired to reverse the direction of rotation. The coupling means is sufficiently resilient to permit a degree of relative rotation between the hub and wheel after the wheel has been stopped from rotating in the given direction. The stored energy of the coupling means then starts the hub rotating in a direction opposite to the given direction.

The primary object of the present invention is to provide a bi-directional motor reversal control device for reversing the direction of rotation of the rotor shaft of a bi-directional motor while the motor is energized without stalling the motor.

Another object of the present invention is to provide a bi-directional motor reversal control device for reversing the direction of rotation of the rotor shaft of a bi-directional motor directly at the rotor shaft, allowing reversal of the motor while energized without regard to the position of the rotor with respect to the field poles of the motor.

These and other objects and advantages of the invention will become apparent from the following description of the preferred embodiment of the invention as read in connection with the accompanying drawings in which:

FIGURE 1 is a perspective view illustrating one embodiment of the invention;

FIGURE 2 is a front elevational view of the embodiment of the invention illustrated in FIGURE 1;

FIGURE 3 is a partial front elevational view partially in cross-section illustrating one embodiment of the invention;

FIGURE 4 is an exploded perspective view of one embodiment of the invention;

Figure 5:
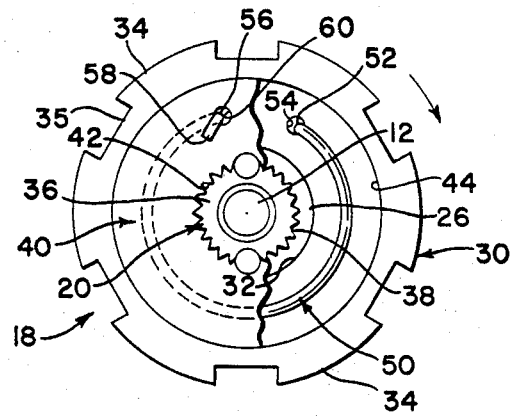
FIGURE 5 is an enlarged side view with parts broken away illustrating the relationship of the ratchet wheel and hub at one instant in time.
Figure 6:
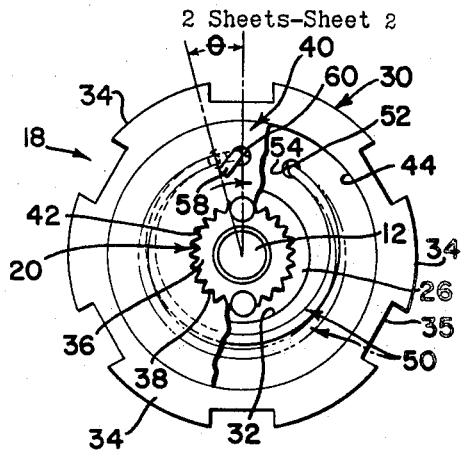
FIGURE 6 is a view similar to that of FIGURE 5 but illustrating the relationship between the ratchet wheel and hub at another instant in time with the ratchet wheel angularly displaced relative to the hub from that illustrated in FIGURE 5.
Figure 7:
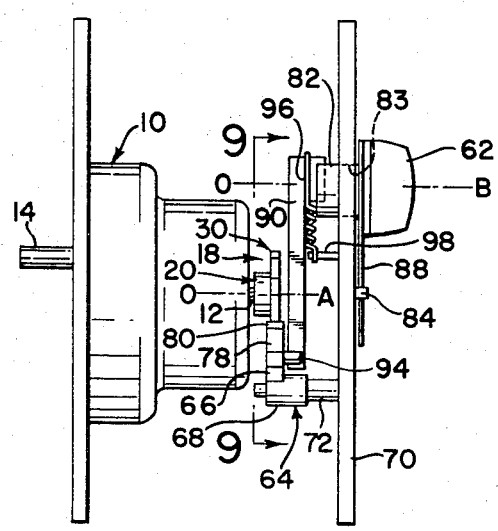
FIGURE 7 is a front elevational view illustrating the embodiment of the invention shown in FIGURE 2 together with a supporting plate and stopping pawl.
Figure 8:
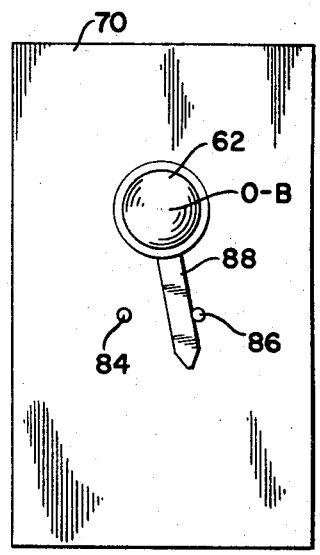
FIGURE 8 is a side view illustrating the supporting plate shown in FIGURE 7.
Figures 9, 10:
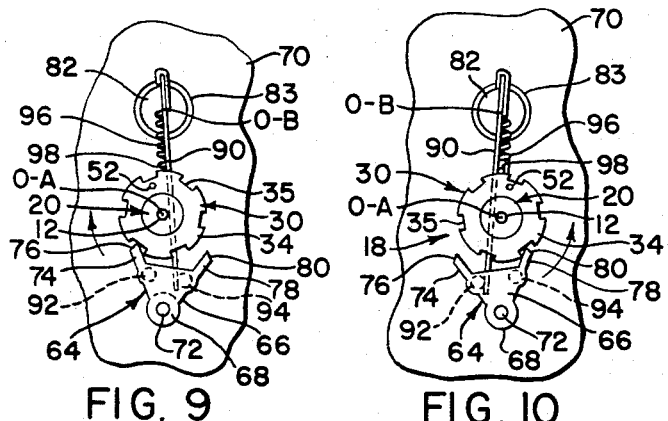

FIGURE 9 is a partial view illustrating the operation of the embodiment of the invention illustrated in FIGURES 1 through 8 at one instant in time and taken on line 9—9 of FIGURE 7; and, FIGURE 10 is a partial view illustrating the embodiment of the invention shown in FIGURES 1 through 8 at another instant in time.

Referring now to the drawings, wherein the showings are for purposes of illustrating one embodiment of the invention and not for limiting same, FIGURES 1, 2 and 3 illustrate a conventional bi-directional motor 10 taking the form of a permanent magnet, synchronous motor without an internal direction control device. Motor 10 has an extended rotor shaft 12 at one end and an output shaft 14 extending from the opposite end of the motor, with a conventional gear train including gear reduction stages 16 interposed between the rotor shaft 12 and the output shaft 14.

In accordance with the present invention, a motor reversal control device, shown generally at 18, is provided for reversing the direction of rotation of rotor shaft 12 and, hence, output shaft 14 while motor 10 is energized. Control device 18 includes the assembly illustrated in FIGURE 4, mounted on the rotor shaft 12, in the manner illustrated in FIGURE 3. Hub 20 is mounted on an end portion of rotor shaft 12 and secured to the shaft for rotation therewith by means of a suitable set screw 22 extending radially inward through a cylindrical body 24 of the hub and tightly engaging rotor shaft 12.

Hub 20 includes a cylindrical shank 26 extending coaxially from body 24. Shank 26 is of smaller diameter than body 24, and defines therewith a radially extending shoulder 28.

An annular ratchet wheel 30, having a circular aperture 32 defined therein, coaxially surrounds shank 26 of hub 20. The diameter of aperture 32 is sufficiently large with respect to the outer diameter of shank 26 to permit relative rotation between wheel 30 and hub 20.

Ratchet wheel 30, which may be constructed of a plastic material such as nylon, is provided with a plurality of abutment stops 34 which extend radially outward from the periphery of the wheel. The hub 20 includes a toothed shank 36 which extends coaxially from shank 26 through the aperture 32 of ratchet wheel 30.

The toothed shank 36 has a plurality of teeth 38 extending radially outward, as illustrated in FIGURE 4. An annular disc shaped cover plate 40, having an aperture 42 defined therein, is securely mounted to the shank portion 36, as by staking with a press fit, with the teeth 38 serving to prevent relative rotation between hub 20 and cover plate 40.

An annular recess 44 is defined in one side of wheel 30 and serves to receive cover plate 40 with a sliding fit, i.e., recess 44 is so dimensioned with respect to cover plate 40 to permit relative rotation therebetween. Preferably, in assembly, as illustrated in FIGURE 3, cover plate 40 is substantially flush with side 46 of wheel 30, whereby a slight space 48 is defined between plate 40 and the floor of recess 44. Resilient means, preferably taking the form of a substantially C-shaped torsion spring 50, is located within the space 48 and positioned generally coaxial with hub 20. A right angle bend 52 is provided at one end of the spring and extends through a suitable aperture 54 in wheel 30. The other end of the spring 50 is provided with a first right angle bend 56 terminating in an angular bend 58, both of which extend through an aperture 60 defined in cover plate 40. The angular bend 58 prevents spring 50 from being dislodged from its interconnection between plate 40 and wheel 30. Spring 50 is, in effect, interposed between wheel 30 and hub 20 and is sufficiently resilient to limit the extent of relative rotation between the hub and wheel, and sufficiently rigid for coupling rotational drive forces between the hub and wheel so that they may rotate together.

Referring now to FIGURES 7, 8, 9 and 10, there is illustrated a pawl actuating knob 62 for selectively positioning a pawl, shown generally at 64, for controlling the direction of rotation of rotor shaft 12, as will be appreciated from the description of operation which follows. Pawl 64 takes the form of a triangular body 66 pivotally mounted at one of its apexes 68 to a support plate 70 by means of a pivot post 72, which, as illustrated in FIGURES 9 and 10, defines a vertically oriented plane with rotational axis O–A of rotor shaft 12.

Extending upwardly and outwardly with respect to the plane defined by post 72 and axis O–A, there is provided a leg 74 depending from the top left apex of the triangular body 66. Leg 74 terminates in a canted stop surface 76 adapted, when positioned as illustrated in FIGURE 9, to be received in a notched spacing 35 defined between adjacent abutments 34 on the periphery of ratchet wheel 30. Canted surface 76 serves in this position as a stop surface to engage an abutment 34 to prevent counterclockwise rotation of wheel 30, as viewed in FIGURE 9. Triangular body 66 is provided with another leg 78 which extends upwardly and outwardly from the top right apex of the body with respect to the vertically oriented plane defined by pivot post 72 and the axis of rotation O–A. Stop leg 78 terminates in a canted stop surface 80, which may be located within a notched spacing 35 of wheel 30 when the body 66 is positioned as is illustrated in FIGURE 10. In this position, the canted surface 80 serves as a stop surface to engage an abutment 34 on the periphery of the ratchet wheel 30 to prevent rotation of wheel 30 in a clockwise direction, as viewed in FIGURE 10.

The knob 62 on the front face of plate 70 serves to selectively position pawl 64 in the right or left position respectively, illustrated in FIGURES 9 and 10. As will be explained in the description of operation hereinafter, when the pawl 64 is in its right position, ratchet wheel 30 is permitted to rotate only in a clockwise direction, as indicated by the arrow in FIGURE 9. Also, when the pawl 64 is in the left position, the ratchet wheel 30 is permitted to rotate only in the counterclockwise direction, as indicated by the arrow in FIGURE 10.

The knob 62 includes a depending cylindrical shank 82 which extends through a suitable aperture 83 in the support plate 70. The walls defining aperture 83 serve as a bearing surface to permit a degree of rotation of shank 82 about its rotational axis O–B when forces are applied to knob 62. Angular displacement of knob 62 about axis O–B is limited by right and left stops 84 and 86 which extend outwardly from the face of support plate 70, and serve to limit angular displacement of a pointer 88 fixed to and extending radially from knob 62 for rotation therewith, as illustrated in FIGURE 8.

An elongated, substantially flat, beam 90 is securely mounted to the cylindrical shank 82 on the back side of support plate 70 and, as illustrated in FIGURES 7, 9 and 10, extends downwardly from the shank 82 to a location between a pair of bosses 92 and 94 extending from the top left and top right apexes of the body portion 66 toward the support plate 70. Beam 90, which is preferably of resilient material such as spring steel, serves, when pivotally displaced by turning knob 62, to selectively engage boss 92 or 94 and, thus, pivot pawl 64 to the position illustrated in FIGURES 9 or 10. To maintain the pawl 64 in its selected position, an over center spring 96, partly located in a slot 97 in beam 90, is secured at one end to the top end portion of beam 90 and at the other end to a stud 98 mounted to and depending from the back side of support plate 70. Stud 98 and the axis of rotation O–B of knob 62 are contained within the same plane as defined by pivot post 72 in the axis of rotation O–A of wheel 30.

*Operation*

In the operation of the motor direction control device, according to the present invention, direction control knob 62 may be positioned so that its pointer 88 bears against either the right or left stops 84 and 86, respectively illustrated in FIGURE 8. With the pointer 88 positioned against stop 86, pawl 64 will be positioned as illustrated in FIGURE 10. If motor 10 was not previously operating and is then energized, its rotor shaft 12 may begin rotation in either of two opposing directions due to its inherent characteristic that it may start and run in either direction. If rotor shaft 12 begins rotation in a counterclockwise direction, as indicated by the arrow in FIGURE 10, abutments 34 will strike and cam against the outwardly extending leg 78 on pawl body 66. As each abutment strikes leg 78 the pawl body will tend to pivot in a clockwise direction about its pivot post 72, which pivotal movement is resiliently resisted by beam 90 bearing against stop 92, as well as the over center spring 96. The opposing resilient forces exerted by beam 90 and over center spring 96 are not sufficient in magnitude to stop the counterclockwise rotation of wheel 30, but are of sufficient magnitude to prevent pawl body 66 from being pivoted from the position shown in FIGURE 10 to that as shown in FIGURE 9. Accordingly, ratchet wheel 30 is permitted to rotate in a counterclockwise direction, as viewed in FIGURE 10.

Since spring 50 drivingly connects hub 20 with wheel 30, it is seen that hub 20 and rotor shaft 12 will likewise rotate in the counterclockwise direction.

In a manner similar to that as described above, if knob 62 is positioned with its pointer bearing against stop 84 so that pawl body 66 takes the position as illustrated in FIGURE 9, rotation of rotor shaft 12 would be permitted in the clockwise direction, as illustrated by the arrow in FIGURE 9.

If the rotor shaft 12 started to rotate in a counterclockwise direction, as indicated by the arrow in FIGURE 10, or had been running in that direction for some time, and it is desired to reverse the direction of rotation so that it rotates in a clockwise direction, as indicated by the arrow in FIGURE 9, then knob 62 would be rotated as to position pointer 88 against stop 84. With pointer 88 positioned against the stop 84, the pawl body 66 will be positioned as illustrated in FIGURE 9. Accordingly, it will be appreciated that as ratchet wheel 30 rotates in a counterclockwise direction, as viewed in FIGURE 9, one of its abutments 34 will engage the canted stop surface of leg 74 extending from pawl body 6. Further rotation in the counterclockwise direction of wheel 30 is prevented due to the jamming action which will take place between the canted stop surface 76 and the associated abutment 34. This operation is best appreciated with reference to FIGURES 5 and 6.

FIGURE 5 illustrates the relationship between ratchet wheel 30 and cover plate 40 during rotation in a direction as indicated by the arrow in FIGURE 5, it being understood that the illustrations in FIGURES 5 and 6 are taken from a direction opposite to that of the illustrations in FIGURES 9 and 10. When the wheel 30 is abruptly stopped, the hub 20, and hence shaft 12, will continue to rotate in the direction indicated by the arrow in FIGURE 6 for an extent determined, at least in part, by the resiliency of torsion spring 50, and then stop. During the period after ratchet wheel 30 has stopped and until the hub 20 has stopped, the torsion spring 50 will absorb kinetic energy while its end 56 is displaced an angular distance θ toward its opposite end 52. When hub 20 comes to rest it will be resiliently biased in a direction opposite to that of the arrow shown in FIGURE 6 with respect to the wheel 30. Accordingly, the energy absorbed by the torsion spring as it cushioned the stop of hub 20, will be released so as to impart an impulse of energy to the hub. This will cause the rotor shaft 12 to begin rotation in the opposite direction from that indicated by the arrow in FIGURE 6 rather than stall, which might be the case if torsion spring 50 had been omitted from the structure.

Returning now to the description with respect to FIGURE 9, it is seen that after an abutment 34 on the periphery of ratchet wheel 30 strikes the canted stop surface 76 of leg 74 extending from the pawl body 66, the ratchet wheel will immediately stop, which is followed soon thereafter with a stoppage of the rotor shaft 12. The shaft 12 will then, due to the energy released by torsion spring 50, change its direction of rotation and rotate in the direction as indicated by the arrow in FIGURE 9.

It should be appreciated that for best operation the mass of ratchet wheel 30 should be substantially less than that of hub 20 and shaft 12. This is so in order to prevent inadvertent biasing of spring 50 while rotor shaft 12 is continuously rotating in a given direction, which is to be thereafter reversed. Thus, for example, if the mass of wheel 30 is exceedingly large with respect to that of hub 20, its inertia might deflect spring 50 during rotation of shaft 12. A suitable material for construction of ratchet wheel 30 may be of a light, but yet strong, plastic such as nylon.

Although the invention has been shown in connection with a preferred embodiment, it will be readily apparent to those skilled in the art that various changes in form of arrangement of parts may be made to suit requirements without departing from the spirit and scope of the invention as defined by the appended claims.

What is claimed is:

1. A control device for reversing the direction of rotation of the rotor shaft of a bi-directional motor while the motor is energized, comprising: a first member adapted to be mounted on said shaft for rotation therewith, a second member rotatably mounted in substantial coaxial relationship to said first member, means for resiliently coupling rotational drive forces between said members, means for engaging said second member to stop rotation of said second member in either direction, said coupling means being sufficiently resilient to permit a degree of relative rotation of said first member after said second member has stopped rotation in one of said directions and thereby store energy in said coupling means, which energy ultimately rebounds said first member for rotation in the other direction.

2. A control device as set forth in claim 1 wherein said coupling means is a torsion spring.

3. A control device as set forth in claim 2 wherein said torsion spring is substantially C-shaped and is substantially in coaxial relationship with the axis of rotation of said first member with one end of said spring being connected to said second member and the other end of said spring being connected with said first member.

4. A control device as set forth in claim 1 wherein the mass of said second member is substantially less than that of said first member so that said coupling means is not substantially resiliently biased during continuous rotation of the rotor shaft.

5. A control device as set forth in claim 1 wherein said first member includes a cylindrical shank extending coaxially therefrom, said second member coaxially surrounding said shank in loose fitting relationship thereto for relative rotation with respect thereto.

6. A control device as set forth in claim 5 wherein said second member includes a plurality of radially extending abutments.

7. A control device as set forth in claim 6 wherein said stop means includes a pawl, and a support plate, said pawl being movably mounted on said support plate for movement into engagement with one of said abutments for stopping rotation of said second member in one of said opposing directions.

8. A control device as set forth in claim 7 wherein said pawl is pivotally mounted on said support plate and includes first and second stop legs depending therefrom for engaging said abutments to respectively stop rotation of said second member in first and second opposing directions.

9. A control device as set forth in claim 8 including positioning means for selectively positioning said pawl so that its first and second legs are selectively positioned in abutment engaging positions to stop rotation of said second member in said first and second opposing directions respectively.

10. A control device as set forth in claim 9 wherein said positioning means includes a beam pivotally mounted on said support plate and adapted to engage said pawl to position said pawl in said first and second abutment engaging positions.

References Cited

UNITED STATES PATENTS 2,788,455   4/1957   Kohlhagen    310—41
3,211,933  10/1965  Kohlhagen    310—164

MILTON O. HIRSHFIELD, *Primary Examiner.*

G. NUNEZ, *Assistant Examiner.*